United States Patent
Kwon et al.

(10) Patent No.: US 10,468,726 B2
(45) Date of Patent: Nov. 5, 2019

(54) NEGATIVE ELECTRODE FOR PREVENTING DEPOSITION OF MANGANESE AND BATTERY CELL INCLUDING THE SAME

(71) Applicant: LG Chem, Ltd., Seoul (KR)

(72) Inventors: Ji Yoon Kwon, Daejeon (KR); Kyoung Ho Kim, Daejeon (KR); Je Young Kim, Daejeon (KR); Hoe Jin Hah, Daejeon (KR); Il Hong Kim, Daejeon (KR); In Sung Uhm, Daejeon (KR)

(73) Assignee: LG Chem, Ltd. (KR)

( * ) Notice: Subject to any disclaimer, the term of this patent is extended or adjusted under 35 U.S.C. 154(b) by 194 days.

(21) Appl. No.: 14/888,997

(22) PCT Filed: Jul. 28, 2014

(86) PCT No.: PCT/KR2014/006896
§ 371 (c)(1),
(2) Date: Nov. 4, 2015

(87) PCT Pub. No.: WO2015/016560
PCT Pub. Date: Feb. 5, 2015

(65) Prior Publication Data
US 2016/0133994 A1    May 12, 2016

(30) Foreign Application Priority Data

Jul. 29, 2013 (KR) .................. 10-2013-0089385

(51) Int. Cl.
*H01M 10/42* (2006.01)
*H01M 10/0525* (2010.01)
(Continued)

(52) U.S. Cl.
CPC ..... *H01M 10/4235* (2013.01); *H01M 2/0237* (2013.01); *H01M 2/06* (2013.01);
(Continued)

(58) Field of Classification Search
CPC .......... H01M 10/058; H01M 10/0525; H01M 10/0445; H01M 4/133; H01M 4/134;
(Continued)

(56) References Cited

U.S. PATENT DOCUMENTS 6,225,778 B1 * 5/2001 Hayama .............. H01M 2/1061
320/112
9,281,526 B1 * 3/2016 Liu .................... H01M 10/0445
(Continued)

FOREIGN PATENT DOCUMENTS

JP   2003297341 A   10/2003
JP   2003331813 A   11/2003
(Continued)

OTHER PUBLICATIONS

International Search Report for Application No. PCT/KR2014/006896 dated Oct. 30, 2014.

*Primary Examiner* — Eugenia Wang
(74) *Attorney, Agent, or Firm* — Lerner, David, Littenberg, Krumholz & Mentlik, LLP

(57) ABSTRACT

Disclosed is a battery cell having an electrode assembly that is sealed with an electrolyte solution within a battery case, the electrode assembly including one or more positive electrodes to which a positive electrode terminal is connected; one or more first negative electrodes to which a first negative electrode terminal is connected; one or more second negative electrodes to which a second negative electrode terminal is connected; and a separator disposed between the positive electrode and the first negative electrode or second negative electrode, or a separator disposed between the positive electrode and the first negative electrode or second negative electrode and a separator disposed between the first negative electrode and the second negative electrode.

21 Claims, 2 Drawing Sheets

(51) Int. Cl.

| | |
|---|---|
| *H01M 4/38* | (2006.01) |
| *H01M 4/583* | (2010.01) |
| *H01M 4/131* | (2010.01) |
| *H01M 4/133* | (2010.01) |
| *H01M 4/134* | (2010.01) |
| *H01M 2/30* | (2006.01) |
| *H01M 4/505* | (2010.01) |
| *H01M 10/04* | (2006.01) |
| *H01M 10/052* | (2010.01) |
| *H01M 10/058* | (2010.01) |
| *H01M 2/02* | (2006.01) |
| *H01M 2/06* | (2006.01) |
| *H01M 4/02* | (2006.01) |

(52) U.S. Cl.
CPC ............ *H01M 2/30* (2013.01); *H01M 4/131* (2013.01); *H01M 4/133* (2013.01); *H01M 4/134* (2013.01); *H01M 4/386* (2013.01); *H01M 4/505* (2013.01); *H01M 4/583* (2013.01); *H01M 10/0445* (2013.01); *H01M 10/052* (2013.01); *H01M 10/058* (2013.01); *H01M 10/0525* (2013.01); *H01M 2004/027* (2013.01); *H01M 2004/028* (2013.01); *H01M 2220/20* (2013.01); *Y02T 10/7011* (2013.01)

(58) Field of Classification Search
CPC ...... H01M 4/131; H01M 4/583; H01M 4/386; H01M 4/505; H01M 2/06; H01M 2/0237; H01M 2/30; H01M 2004/028; H01M 2004/027; H01M 2220/20; Y02T 10/7011
See application file for complete search history.

(56) References Cited

U.S. PATENT DOCUMENTS

| | | | |
|---|---|---|---|
| 2009/0123823 A1* | 5/2009 | Ando | H01M 4/485 429/129 |
| 2010/0009245 A1 | 1/2010 | Howard et al. | |
| 2010/0190081 A1 | 7/2010 | Park et al. | |
| 2010/0216027 A1* | 8/2010 | Fujii | H01G 9/016 429/246 |
| 2010/0255356 A1* | 10/2010 | Fujii | H01G 11/06 429/94 |

FOREIGN PATENT DOCUMENTS

| | | |
|---|---|---|
| JP | 2011228118 A | 11/2011 |
| KR | 20070118715 A | 12/2007 |

* cited by examiner

[FIG. 1]
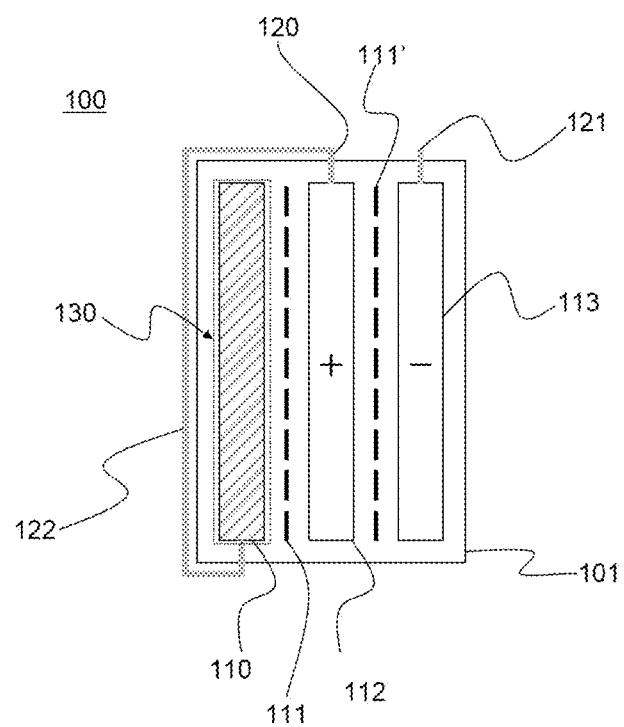

[FIG. 2]
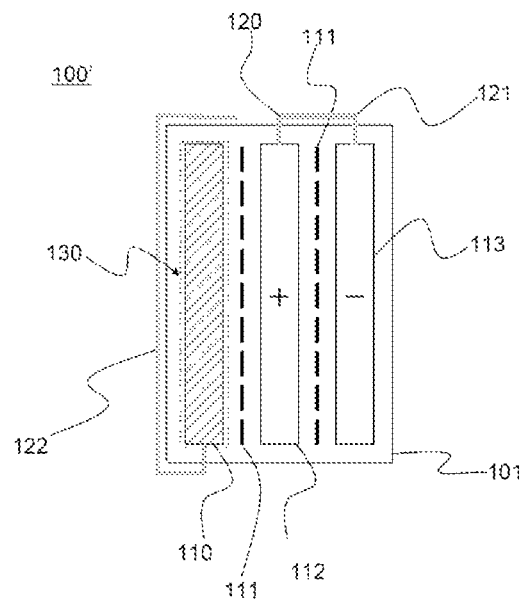
[FIG. 3]
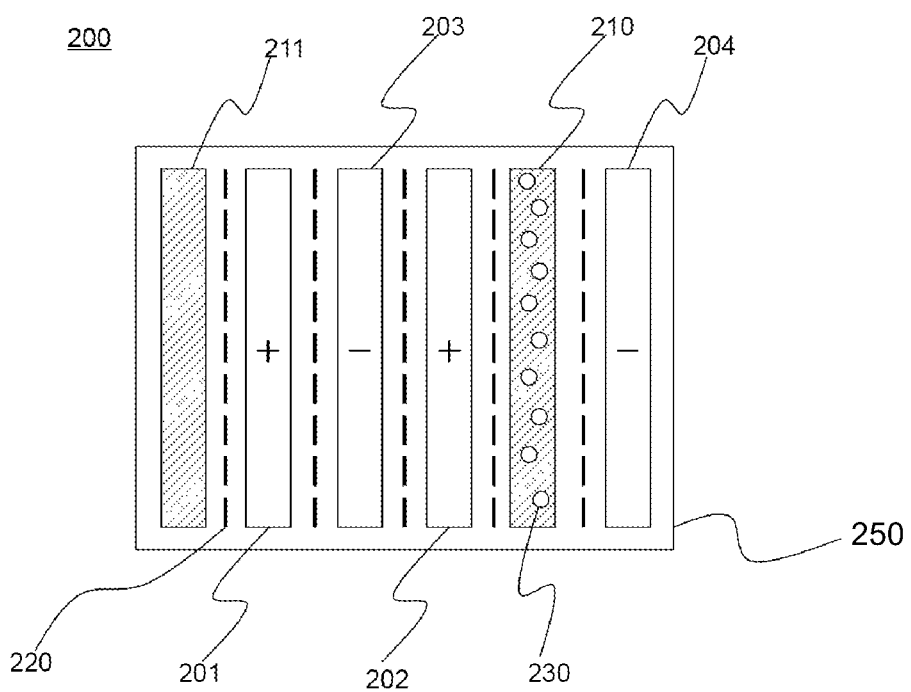

NEGATIVE ELECTRODE FOR PREVENTING DEPOSITION OF MANGANESE AND BATTERY CELL INCLUDING THE SAME

CROSS REFERENCE TO RELATED APPLICATIONS

The present application is a national phase entry under 35 U.S.C. § 371 of International Application No. PCT/KR2014/006896, filed Jul. 28, 2014, which claims priority to Korean Patent Application No. 10-2013-0089385, filed Jul. 29, 2013, the disclosures of which are incorporated herein by reference.

TECHNICAL FIELD

The present invention relates to a negative electrode for preventing deposition of manganese and a battery cell including the same.

BACKGROUND ART

As mobile device technology continues to develop and demand therefor continues to increase, demand for secondary batteries as energy sources is rapidly increasing. Among these secondary batteries, lithium secondary batteries which exhibit high energy density and voltage, long lifespan and low self-discharge rate are commercially available and widely used.

As positive electrode active materials for such lithium secondary batteries, lithium-containing cobalt oxides such as $LiCoO_2$ are mainly used. In addition, use of lithium-containing manganese oxides such as $LiMnO_2$ having a layered crystal structure, $LiMn_2O_4$ having a spinel crystal structure and the like, and lithium-containing nickel oxides such as $LiNiO_2$ is also under consideration.

In particular, lithium manganese-containing oxides such as $LiMnO_2$, $LiMn_2O_4$, and the like, are advantageous in that they contain Mn, which is an abundant and environmentally friendly raw material. In addition, high-capacity lithium secondary batteries may be manufactured using the lithium manganese-containing oxides. As such, lithium manganese-containing oxides are receiving attention as a positive electrode active material of lithium secondary batteries.

However, when a lithium manganese-containing oxide is applied to a positive electrode, $Mn^{3+}$ ions in the lithium manganese-containing oxide are decomposed into $Mn^{2+}$ and $Mn^{4+}$ as cycling of a lithium secondary battery proceeds, whereby a capacity of a positive electrode is considerably reduced. In particular, $Mn^{2+}$ is dissolved in an electrolyte solution, decomposing an electrolyte solution while being deposited on a negative electrode having a lower potential. Accordingly, cycle characteristics are rapidly deteriorated.

Therefore, there is an urgent need for technology to resolve such problems.

DISCLOSURE

Technical Problem

Therefore, the present invention has been made to solve the above problems and other technical problems that have yet to be resolved.

As a result of a variety of extensive and intensive studies and experiments, the inventors of the present invention confirmed that desired effects may be accomplished by including a separate second negative electrode that induces deposition of $Mn^{2+}$, thus completing the present invention.

Technical Solution

In accordance with one aspect of the present invention, provided is a battery cell having an electrode assembly that is sealed with an electrolyte solution within a battery case, the electrode assembly including:

one or more positive electrodes to which a positive electrode terminal is connected;

one or more first negative electrodes to which a first negative electrode terminal is connected;

one or more second negative electrodes to which a second negative electrode terminal is connected; and a separator disposed between the positive electrode and the first negative electrode or second negative electrode, or a separator disposed between the positive electrode and the first negative electrode or second negative electrode and a separator disposed between the first negative electrode and the second negative electrode.

In a non-limiting embodiment, the one or more second negative electrodes may be electrically connected with the one or more positive electrodes via the second negative electrode terminal and the positive electrode terminal in an activation process of the battery cell.

In general, $Mn^{2+}$ is deposited on a negative electrode due to an electrochemical gradient formed within a battery cell. When the electrochemical gradient is formed to a voltage or lower voltage at which $Mn^{2+}$ reacts, most $Mn^{2+}$ may be deposited again on a positive electrode.

In particular, since a positive electrode may be charged up to 4.65 V with respect to $Li/Li^+$ and $Mn^{2+}$ is deposited at approximately 1.86 V or less with respect to $Li/Li^+$, voltage of the second negative electrode may be 1.86 V or less in order for deposition of $Mn^{2+}$.

However, when the second negative electrode has a low voltage of 1 V or less, $Mn^{2+}$ and $Li^+$ may be deposited on a second negative electrode and decomposition reaction of an electrolyte solution may be accelerated due to reduction of an electrolyte solution. Therefore, such that lithium is not deposited and only Mn is deposited without the decomposition reaction of the electrolyte solution, the second negative electrode may have a voltage of 1 V to 1.86 V.

In this case, an electrochemical gradient of approximately 2.8 V to 3.65 V with respect to $Li/Li^+$ is formed between the positive electrode and the second negative electrode, and by connecting the second negative electrode to the positive electrode, $Mn^{2+}$ is deposited on a second negative electrode when the battery cell is activated, a considerable amount of initial $Mn^{2+}$ may be deposited on the second negative electrode.

Therefore, the second negative electrode corresponds to a sacrificial electrode that reduces the concentration of $Mn^{2+}$ in an initial activation process, and the activation process may be performed at a potential of 2.8 V to 3.65 V with respect to $Li/Li^+$.

In a non-limiting embodiment, after activating the positive electrode and the second negative electrode as described above, the one or more first negative electrodes may be electrically connected with the one or more positive electrodes via the first negative electrode terminal and the positive electrode terminal during operation of the battery cell.

In this case, since the second negative electrode having $Mn^{2+}$ deposited in a considerable amount on a surface thereof does not form additional electrochemical gradient, $Mn^{2+}$ reaction possibility is dramatically decreased in electrochemical gradient between the positive electrode and the first negative electrode terminal.

In a non-limiting embodiment, locations of the one or more second negative electrodes are not greatly limited and, in general, when the positive electrode and the first negative electrode are electrically connected after activating the positive electrode and the second negative electrode, lithium ions may be located such that migration courses of the lithium ions are shortened.

In particular, the one or more second negative electrodes may be selectively located between the positive electrode and the first negative electrode and in the outermost area of the electrode assembly.

In addition, the number of the one or more second negative electrodes included in the electrode assembly may be smaller than or the same as the number of the positive electrodes.

The positive electrode terminal, the first negative electrode terminal and the second negative electrode terminal may protrude to the outside of the battery case to facilitate mutual electrical connection and short circuit.

The positive electrode terminal, the first negative electrode terminal and the second negative electrode terminal may be formed while not contacting to one another in the form of wrapping an outer circumference of the battery case at the outside of the battery case.

In a non-limiting embodiment, the positive electrode terminal, the first negative electrode terminal and the second negative electrode terminal may be an electrode tab or an electrode lead.

In a non-limiting embodiment, a face or both faces of electrode current collectors of the one or more positive electrodes, the one or more first negative electrodes and the one or more second negative electrodes may be coated with an electrode mixture including an electrode active material.

In an embodiment of the current collector, the electrode current collector of the one or more second negative electrodes may be a mesh-shaped porous metal. Therefore, although the one or more second negative electrodes are located between the positive electrode and the first negative electrode, the mesh-shaped porous metal electrode current collector of the one or more second negative electrodes desirably guarantees mobility of lithium ions migrating between the positive electrode and the first negative electrode.

In another embodiment of the current collector, the electrode current collectors of the one or more positive electrodes, the one or more first negative electrodes and the one or more second negative electrodes may be mesh-shaped porous metals.

The porous metal is not specifically limited so long as the porous metal has high electrical conductivity, but particularly may be a metal selected from the group consisting of copper, stainless steel, nickel and aluminum, or an alloy thereof. However, the present invention is not limited thereto.

Meanwhile, the electrode active material of the one or more positive electrodes may include a lithium transition metal oxide represented by Formula 1 or 2 below.

$$Li_xM_yMn_{2-y}O_{4-z}A_z \quad (1)$$

wherein M is at least one element selected from the group consisting of Al, Mg, Ni, Co, Fe, Cr, V, Ti, Cu, B, Ca, Zn, Zr, Nb, Mo, Sr, Sb, W, Ti and Bi;

A is at least one monovalent or divalent anion; and $0.9 \leq x \leq 1.2$, $0 < y < 2$, and $0 \leq z < 0.2$.

$$(1-x)LiM'O_{2-y}A_y \cdot xLi_2MnO_{3-y'}A_{y'} \quad (2)$$

wherein M' is $Mn_aM_b$;

M is at least one selected from the group consisting of Ni, Ti, Co, Al, Cu, Fe, Mg, B, Cr, Zr, Zn and Period II transition metals;

A is at least one selected from the group consisting of anions such as $PO_4$, $BO_3$, $CO_3$, F and $NO_3$; and $0 < x < 1$, $0 < y \leq 0.02$, $0 < y' \leq 0.02$, $0.5 \leq a \leq 1.0$, $0 \leq b \leq 0.5$, and $a+b=1$.

In a non-limiting embodiment, the electrode active materials of the one or more first negative electrodes and the one or more second negative electrodes may include a carbon based material and/or Si.

In a non-limiting embodiment, the battery case may be composed of a laminate sheet including a resin layer and a metal layer.

In a non-limiting embodiment, the battery cell may be a lithium ion battery, a lithium ion polymer battery or a lithium polymer battery.

The present invention provides a battery module including the battery cell as a unit cell, a battery pack including the battery module and a device including the battery pack as a power source.

In this regard, the device may be an electric vehicle, a hybrid electric vehicle, a plug-in hybrid electric vehicle or a system for storing power.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic diagram of a battery cell according to one embodiment of the present invention;

FIG. 2 is a schematic diagram of a battery cell operated after activating the battery cell illustrated in FIG. 1; and FIG. 3 is a schematic diagram of a battery cell according to another embodiment of the present invention.

MODE FOR INVENTION

Now, the present invention will be described in more detail with reference to the accompanying drawings. These examples are provided for illustrative purposes only and should not be construed as limiting the scope and spirit of the present invention.

FIG. 1 schematically illustrates a battery cell according to an embodiment of the present invention, and FIG. 2 schematically illustrates a battery cell operated after the activation process of the battery cell according to FIG. 1.

Referring to these drawings, a battery cell 100 may be installed within a battery case 101 in which separators 111 and 111' are interposed between a second negative electrode 110 located in the outermost area of the electrode assembly, a positive electrode 112 and a first negative electrode 113.

The battery cell 100 is activated when the second negative electrode 110 is electrically connected to a positive electrode terminal 120 of a positive electrode 112 via a second negative electrode terminal 122. In this process, the positive electrode 112 exhibits a potential of approximately 4.65 V, a second negative electrode exhibits a voltage of approximately 1.86 V, electrochemical gradient of approximately 2.8 V is formed between the positive electrode 112 and the second negative electrode 110, and a surface of the second negative electrode 110 is deposited. Furthermore, as activation continues, deposited $Mn^{2+}$ forms a manganese layer on a surface of the second negative electrode 130.

Subsequently, a battery cell 100' is operated by electrically connecting a positive electrode terminal 120 and a first negative electrode terminal 121 when electrical connection of the second negative electrode terminal 122 and the positive electrode terminal 120 is blocked. In addition, since the second negative electrode 110 is no longer electrically connected to a positive electrode 111, an electrochemical gradient is not formed and thus deposition of $Mn^{2+}$ is ceased. In addition, since a considerable amount of $Mn^{2+}$ was depleted within the battery cell 100', $Mn^{2+}$ is not substantially deposited on a first negative electrode 121.

FIG. 3 schematically illustrates a battery cell according to another example of the present invention.

Referring to FIG. 3, a battery cell 200 is installed within a battery case 250 in which a separator 220 is interposed between positive electrodes 201 and 202, one or more first negative electrodes 203 and 204 and one or more second negative electrodes 210 and 211.

In the activation process in which an electrochemical gradient is formed between the positive electrodes 201 and 202, and between the one or more second negative electrodes 210 and 211, manganese ions generated from the positive electrodes 201 and 202 migrate to the one or more second negative electrodes 210 and 211. At this time, when first negative electrodes 203 and 204 exist on a migration course of manganese ions, manganese ions are physically adsorbed to the first negative electrodes 203 and 204, or mobility of ions may be deteriorated due to an extended migration course of manganese ions. Accordingly, each of the one or more second negative electrodes 210 and 211 may be disposed adjacent the positive electrodes 201 and 202.

In this regard, in FIG. 3 illustrating another example according to the present invention, the second negative electrode 211 is disposed in the outermost area of the electrode assembly adjacent the positive electrode 201, and the other second negative electrode 210 is disposed between the positive electrode 202 and the first negative electrode 204.

In addition, an ion passage 230 may be formed on the second negative electrode 210 disposed between the positive electrode 202 and the first negative electrode 204 such that mobility of lithium ions that migrate between the positive electrode 202 and a first negative electrode 204 after the activation process is not limited. The ion passage 230 may be a fine pore or a penetrated hole.

The number of the one or more second negative electrodes 210 and 211 is the same as the number of positive electrodes 201 and 202.

Meanwhile, the battery cell according to the present invention includes an electrode mixture, which includes an electrode active material, coated on an electrode current collector.

In one specific embodiment, the electrode may be a positive electrode.

In general, the positive electrode is prepared by drying after coating a mixture of a positive electrode active material, a conductive material and a binder, as an electrode mixture, on a positive electrode current collector. In this case, as desired, the mixture may further include a filler.

Examples of the positive electrode active material may include, in addition to the lithium transition metal oxide represented by Formula 1 or 2, layered compounds such as lithium cobalt oxide ($LiCoO_2$) and lithium nickel oxide ($LiNiO_2$) or compounds substituted with one or more transition metals; lithium manganese oxides represented by $Li_{1+x}Mn_{2-x}O_4$ where $0 \leq x \leq 0.33$, such as $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{1-x}M_xO_2$ where M=Co, Mn, Al, Cu, Fe, Mg, B, or Ga, and $0.01 \leq x \leq 0.3$; lithium manganese composite oxides having the formula $LiMn_{2-x}M_xO_2$ where M=Co, Ni, Fe, Cr, Zn, or Ta, and $0.01 \leq x \leq 0.1$ or the formula $Li_2Mn_3MO_8$ where M=Fe, Co, Ni, Cu, or Zn; spinel-structure lithium manganese composite oxides represented by $LiNi_xMn_{2-x}O_4$; $LiMn_2O_4$ where some of the Li atoms are substituted with alkaline earth metal ions; disulfide compounds; $Fe_2(MoO_4)_3$; and the like, but embodiments of the present invention are not limited thereto.

The positive electrode current collector is generally fabricated to a thickness of 3 to 500 μm. The positive electrode current collector is not particularly limited so long as it does not cause chemical changes in the fabricated lithium secondary battery and has high conductivity. For example, the positive electrode current collector may be made of stainless steel, aluminum, nickel, titanium, sintered carbon, aluminum or stainless steel surface-treated with carbon, nickel, titanium, or silver, or the like. The positive electrode current collector may have fine irregularities at a surface thereof to increase adhesion between the positive electrode active material and the positive electrode current collector. In addition, the positive electrode current collector may be used in any of various forms including films, sheets, foils, nets, porous structures, foams, and non-woven fabrics.

The conductive material is generally added in an amount of 1 to 50 wt % with respect to the total weight of a mixture including a positive electrode active material. Such a conductive material is not specifically limited so long as it does not cause chemical changes in the fabricated battery and has conductivity. For example, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide whiskers and potassium titanate whiskers; conductive metal oxides such as titanium oxide; conductive materials such as polyphenylene derivatives; and the like may be used.

Meanwhile, a graphite based material having elasticity may be used as a conductive material and may be used with the materials listed above.

The binder is a component assisting in binding between an active material and the conductive material and in binding of the active material to a current collector. The binder is typically added in an amount of 1 to 50 wt % based on the total weight of the mixture including the positive electrode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit positive electrode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

Meanwhile, the battery cell may be a lithium secondary battery such as a lithium ion battery, a lithium ion polymer battery, or a lithium polymer battery.

In general, the lithium secondary battery includes a positive electrode, a negative electrode, a separator disposed between the positive electrode and the negative electrode, and a lithium salt-containing non-aqueous electrolyte. The other components of the lithium secondary batteries will be described below.

The negative electrode may be prepared by coating, drying and pressing a negative electrode active material on a negative electrode current collector. As desired, the conductive material, the binder, the filler and the like described above may be selectively further included.

Examples of the negative electrode active material include carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Group I, II and III elements, or halogens; $0 < x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials; titanium oxides; lithium titanium oxides; and the like, particularly carbon based materials and/or Si.

The negative electrode current collector is typically fabricated to a thickness of 3 to 500 μm. The negative electrode current collector is not particularly limited so long as it does not cause chemical changes in the fabricated battery and has conductivity. For example, the negative electrode current collector may be made of copper, stainless steel, aluminum, nickel, titanium, sintered carbon, copper or stainless steel surface-treated with carbon, nickel, titanium, or silver, and aluminum-cadmium alloys. Similar to the positive electrode current collector, the negative electrode current collector may also have fine irregularities at a surface thereof to enhance adhesion between the negative electrode current collector and the negative electrode active material and may be used in various forms including films, sheets, foils, nets, porous structures, foams, and non-woven fabrics.

The separator is disposed between the positive electrode and the negative electrode and, as the separator, a thin insulating film with high ion permeability and high mechanical strength is used. The separator generally has a pore diameter of 0.01 to 10 μm and a thickness of 5 to 300 μm. As the separator, for example, sheets or non-woven fabrics, made of an olefin-based polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing non-aqueous electrolyte consists of a non-aqueous electrolyte and lithium. As the non-aqueous electrolyte, a non-aqueous organic solvent, an organic solid electrolyte, an inorganic solid electrolyte or the like may be used, but the present invention is not limited thereto.

Examples of the non-aqueous organic solvent include non-aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$ The lithium salt is a material that is readily soluble in the non-aqueous electrolyte and examples thereof include, but are not limited to, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imides In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the lithium salt-containing non-aqueous electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas, and fluoro-ethylene carbonate (FEC), propene sultone (PRS) and the like may be further included.

In one specific embodiment, a lithium salt-containing non-aqueous electrolyte may be prepared by adding a lithium salt such as $LiPF_6$, $LiClO_4$, $LiBF_4$, $LiN(SO_2CF_3)_2$, or the like to a mixed solvent including EC or PC, which is a high dielectric solvent and a cyclic carbonate, and DEC, DMC, or EMC, which is a low viscosity solvent and a linear carbonate.

The present invention may provide a battery module including the battery cell as a unit cell, a battery pack including the battery module, and a device including the battery pack as a power source.

In this regard, particular examples of the device include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, since a positive electrode and a first negative electrode are electrically connected after inducing deposition of a considerable amount of $Mn^{2+}$ via a second negative electrode in an activation process of a battery cell according to the present invention, deterioration of cycle characteristics due to Mn²⁺ is fundamentally resolved when the battery cell using the first negative electrode is actually operated, thus desired battery cell performance may be exhibited.

The invention claimed is:

1. A battery cell having an electrode assembly that is sealed with an electrolyte solution within a battery case, the electrode assembly comprising:
   first and second negative electrodes electrically connected to first and second negative electrode terminals, respectively;
   a positive electrode electrically connected to a positive electrode terminal and disposed between the first and second negative electrodes; and
   first and second separators disposed between the positive electrode and the first and second negative electrodes, respectively,
   the battery cell having an activation configuration and an operation configuration,
   wherein the battery cell in the activation configuration has an electrical connection between the positive electrode terminal and the second negative electrode terminal, while electrical connection between the positive electrode terminal and the first negative electrode terminal is blocked, and
   wherein the battery cell in the operation configuration has an electrical connection between the positive electrode terminal and the first negative electrode terminal, while electrical connection between the positive electrode terminal and the second negative electrode terminal is blocked.

2. The battery cell according to claim 1, wherein an activation process is performed in a potential of 2.8 V to 3.65 V with respect to Li/Li+.

3. The battery cell according to claim 1, wherein the second negative electrode are located in an outermost area of the electrode assembly.

4. The battery cell according to claim 1, wherein the positive electrode terminal, the first negative electrode terminal and the second negative electrode terminal protrude to outside of the battery case.

5. The battery cell according to claim 4, wherein the positive electrode terminal, the first negative electrode terminal and the second negative electrode terminal are formed while not contacting to one another in the form of wrapping an outer circumference of the battery case at the outside of the battery case.

6. The battery cell according to claim 1, wherein the positive electrode terminal, the first negative electrode terminal and the second negative electrode terminal are an electrode tab or an electrode lead.

7. The battery cell according to claim 1, wherein one face or two opposing faces of electrode current collectors of the positive electrode, the first negative electrode and the second negative electrode are coated with electrode mixtures comprising respective electrode active materials.

8. The battery cell according to claim 7, wherein the electrode current collector of the second negative electrode is a mesh-shaped porous metal.

9. The battery cell according to claim 8, wherein the porous metal is a metal selected from the group consisting of copper, stainless steel, nickel and aluminum, or an alloy thereof.

10. The battery cell according to claim 7, wherein the electrode current collectors of the positive electrode, the negative electrode and the second negative electrode are mesh-shaped porous metals.

11. The battery cell according to claim 10, wherein the porous metal is a metal selected from the group consisting of copper, stainless steel, nickel and aluminum, or an alloy thereof.

12. The battery cell according to claim 7, wherein the electrode active material of the positive electrode comprises a lithium transition metal oxide represented by Formula 1 or 2 below:

$$Li_xM_yMn_{2-y}O_{4-z}A_z \quad (1)$$ 

wherein M is at least one element selected from the group consisting of Al, Mg, Ni, Co, Fe, Cr, V, Ti, Cu, B, Ca, Zn, Zr, Nb, Mo, Sr, Sb, W, Ti and Bi;
A of Formula 1 is at least one monovalent or divalent anion; $0.9 \leq x \leq 1.2$, $0 < y < 2$, and $0 \leq z < 0.2$, $$(1-x)LiM'O_{2-y}A_y-xLi_2MnO_{3-y'}A_{y'} \quad (2)$$ 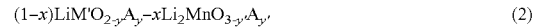

wherein M' is $Mn_aM_b$;
M is at least one selected from the group consisting of Ni, Ti, Co, Al, Cu, Fe, Mg, B, Cr, Zr, Zn and Period II transition metals;
A of Formula 2 is at least one selected from the group consisting of PO₄, BO₃, CO₃, F and NO₃; and
$0 < x < 1$, $0 < y < 0.02$, $0 < y' \leq 0.02$, $0.5 \leq a \leq 1.0$, $0 \leq b \leq 0.5$, and $a+b=1$.

13. The battery cell according to claim 7, wherein the electrode active materials of the first negative electrode and the second negative electrode comprise a carbon based material and/or Si.

14. The battery cell according to claim 1, wherein the battery case is composed of a laminate sheet comprising a resin layer and a metal layer.

15. The battery cell according to claim 1, wherein the battery cell is a lithium ion battery, a lithium ion polymer battery or a lithium polymer battery.

16. A battery module comprising the battery cell according to claim 1.

17. A battery pack comprising the battery module according to claim 16.

18. A device comprising the battery pack according to claim 17 as a power source.

19. The device according to claim 18, the device is an electric vehicle, a hybrid electric vehicle, a plug-in hybrid electric vehicle or a system for storing power.

20. A battery cell having an electrode assembly that is sealed with an electrolyte solution within a battery case, the electrode assembly comprising:
   a positive electrode electrically connected to a positive electrode terminal;
   first and second negative electrodes electrically connected to first and second negative electrode terminals, respectively, the second negative electrode disposed between the positive electrode and the first negative electrode; and
   first and second separators, the first separator disposed between the second negative electrode and the positive electrode, the second separator disposed between the second negative electrode and the first negative electrode;
   the battery cell having an activation configuration and an operation configuration,
   wherein the battery cell in the activation configuration has an electrical connection between the positive electrode terminal and the second negative electrode terminal, while electrical connection between the positive electrode terminal and the first negative electrode terminal is blocked, and wherein the battery cell in the operation configuration has an electrical connection between the positive electrode terminal and the first negative electrode terminal, while electrical connection between the positive electrode terminal and the second negative electrode terminal is blocked.

21. A battery cell having an electrode assembly that is sealed with an electrolyte solution within a battery case, the electrode assembly comprising:

two positive electrodes electrically connected to a positive electrode terminal;

two first negative electrodes electrically connected to a first negative electrode terminal;

two second negative electrodes electrically connected to a second negative electrode terminal, a first one of the second negative electrodes disposed between and adjacent to one of the positive electrodes and the battery case, a second one of the second negative electrodes disposed between and adjacent to one of the positive electrodes and one of the first negative electrodes; and a plurality of separators, each of the electrodes separated from adjacent ones of the other electrodes by a corresponding one of the plurality of separators;

the battery cell having an activation configuration and an operation configuration, wherein the battery cell in the activation configuration has an electrical connection between the positive electrode terminal and the second negative electrode terminal, while electrical connection between the positive electrode terminal and the first negative electrode terminal is blocked, and wherein the battery cell in the operation configuration has an electrical connection between the positive electrode terminal and the first negative electrode terminal, while electrical connection between the positive electrode terminal and the second negative electrode terminal is blocked.

* * * * *